March 17, 1970  F. T. SMITH  3,500,563
WHEEL-TYPE TOP LOADING MACHINE AND METHOD
Filed Sept. 15, 1967  9 Sheets-Sheet 1

Fig. 1

INVENTOR.
Fred T. Smith
BY
ATTORNEYS

March 17, 1970 F. T. SMITH 3,500,563
WHEEL-TYPE TOP LOADING MACHINE AND METHOD
Filed Sept. 15, 1967 9 Sheets-Sheet 2

INVENTOR.
Fred T. Smith
BY _____________ ATTORNEYS

March 17, 1970   F. T. SMITH   3,500,563
WHEEL-TYPE TOP LOADING MACHINE AND METHOD
Filed Sept. 15, 1967   9 Sheets-Sheet 3

INVENTOR.
Fred T. Smith
ATTORNEYS

March 17, 1970  F. T. SMITH  3,500,563
WHEEL-TYPE TOP LOADING MACHINE AND METHOD
Filed Sept. 15, 1967  9 Sheets-Sheet 8

INVENTOR.
Fred T. Smith
BY  ATTORNEYS

United States Patent Office 3,500,563
Patented Mar. 17, 1970

3,500,563
WHEEL-TYPE TOP LOADING
MACHINE AND METHOD
Fred T. Smith, Aurora, Ill., assignor to Barber-Greene
Company, Aurora, Ill., a corporation of Illinois
Filed Sept. 15, 1967, Ser. No. 668,064
Int. Cl. E02f 3/24
U.S. Cl. 37—190
41 Claims

ABSTRACT OF THE DISCLOSURE

A material handling device comprising a frame mounted on three transporting and propelling means and having multiple digging wheels extending transversely from the side of the frame between the transporting and propelling means. The multiple digging wheels are supported on cantilever frame members which include members extending parallel to the main frame to counteract the torsional moment developed by the digging wheels. The outermost digging wheel and its associated frame structure are detachable from the frame member supporting the inner most wheel so that the width of the device may be reduced to facilitate transportation between working locations. The device includes a conveying means comprised of two belts one of which extends into the center of the multiple digging wheels and is detachably mounted on the frame so that when the outer wheel is removed the conveyor can be slid transversely into the remaining digging wheel and frame. The transporting and propelling means include means which allow the relative movement of the transporting and propelling means with respect to each other to adjust the depth and the horizontal angle of the digging wheels.

CROSS-REFERENCES TO RELATED APPLICATION

The present application is a continuation-in-part of my copending United States application Ser. No. 496,107, filed Oct. 14, 1965, now abandoned.

BACKGROUND OF THE INVENTION

Field of the invention

The present invention pertains to a material handling device adapted to be used for a number of purposes such as an excavator or a reclaiming device.

Prior art

Devices for handling material which is either to be excavated from a bank or pile, or to be reclaimed from a pile or accumulation of previously excavated material include top loaders, belt loaders, wheel loaders, push scrapers, front end loaders, shovels and drag lines. These devices are used to load or pick up material and convey them to a truck or some sort of conveying device which would move the material to the ultimate desired destination. The basic difficulty with the above noted devices and material handling methods is that these devices are either too costly to be practical or are too slow to be practical.

An improved method and device for handling materials to be excavated is disclosed in my copending patent application Ser. No. 496,107, filed Oct. 14, 1965, now abandoned which discloses a novel means of using a rotating digging wheel to dig and lift the material on to a conveying belt which conveys it to a vehicle or other conveying means. A device of the above noted application employed a single rotating wheel mounted on a frame which had a three point suspension which could be varied to control the depth of the digging wheel. A second device is disclosed and claimed in my copending application Ser. No. 823,189 filed May 8, 1969 which is a continuation of abandoned application Ser. No. 504,739, filed Oct. 24, 1965 which machine is adapted to reclaim material that has been stored in a large stock pile.

SUMMARY OF THE INVENTION

The present invention is directed to a material handling device utilizing multiple digging wheels supported on a frame and extending transversely from a side of the frame between the front and rear points of suspension for the frame. The frame is provided with cantilever members to support the outermost digging wheel which are detachable so that the width of the device may be reduced to facilitate transporting the device between operating sites. The material handling device of the present invention further includes a conveying means having an inner portion extending through the multiple centers of the multiple digging wheels to receive the material therefrom, the inner portion is detachably mounted on the frame and is slidable with respect to the main frame of the device so that when the outer wheel is removed, the inner conveyor portion may be slid transversely into the frame to reduce the width of the device.

Accordingly, it is an object of the present invention to provide a material handling device utilizing multiple digging wheels which will increase the capacity of the handling device.

A further object of the present invention is to provide a material handling device having a pair of digging wheels supported between the transporting means of the device and extending transversely thereto.

Another object of this invention is to provide a novel suspension for the outer digging wheel on a machine having digging wheels disposed in side-by-side relation.

A still further object of the present invention is to provide a material handling device having a pair of digging wheels for digging and conveying the material to a conveyor means extending into the center of the wheels, the outermost digging wheel being supported on a frame member which is detachable from the device to allow the reduction in the width of the material handling device and therefore facilitate transporting the device between working locations.

Yet another object of the present invention is to provide a material handling device having a pair of digging wheels for digging and conveying material to a portion of the conveyor which passes through the centers of the wheels, the outermost digging wheel being mounted on a cantilever frame which is detachable from the main frame of the device and the conveyor portion extending in the centers of the wheels being slidable transversely with respect to the frame so that the device may be reduced in width to facilitate transporting the device between working locations.

A still further object of the present invention is to provide a multiple digging wheel device in which includes mounting pads on the frame and the outermost digging wheel structure to facilitate the connecting and disconnecting of the outermost digging wheel from the device.

Yet another object of the present invention is to provide a material handling device having multiple digging wheels which include a drive system which supplies additional power to the digging wheels with a corresponding reduction in the speed of advance of the device.

Other objects and features of the present invention will more fully become apparent in view of the following detailed description taken in conjunction with the accompanying drawings illustrating one embodiment.

On the drawings:

FIG. 9 is a side view of the excavator shown in FIG. 7.

Figure 1:
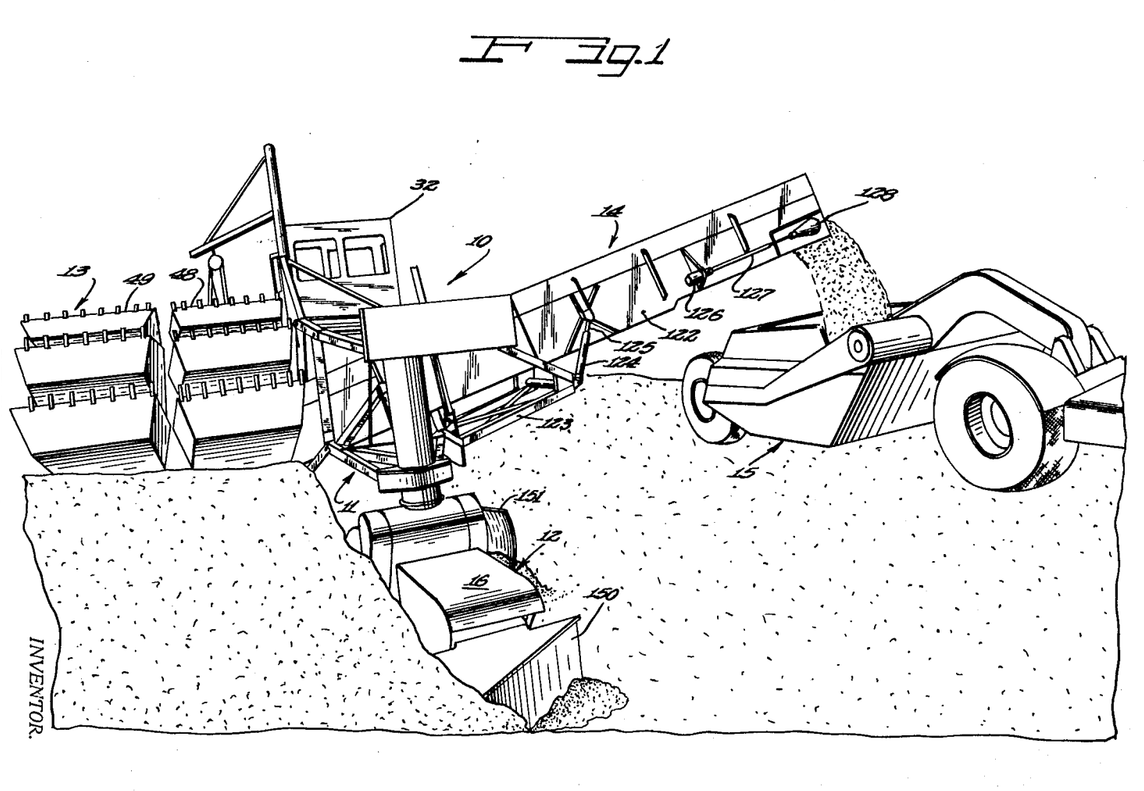
FIG. 1 illustrates the multiple wheel material handling device of the present invention having an excavator digging and conveying material to a transporting receptacle.
Figure 3:
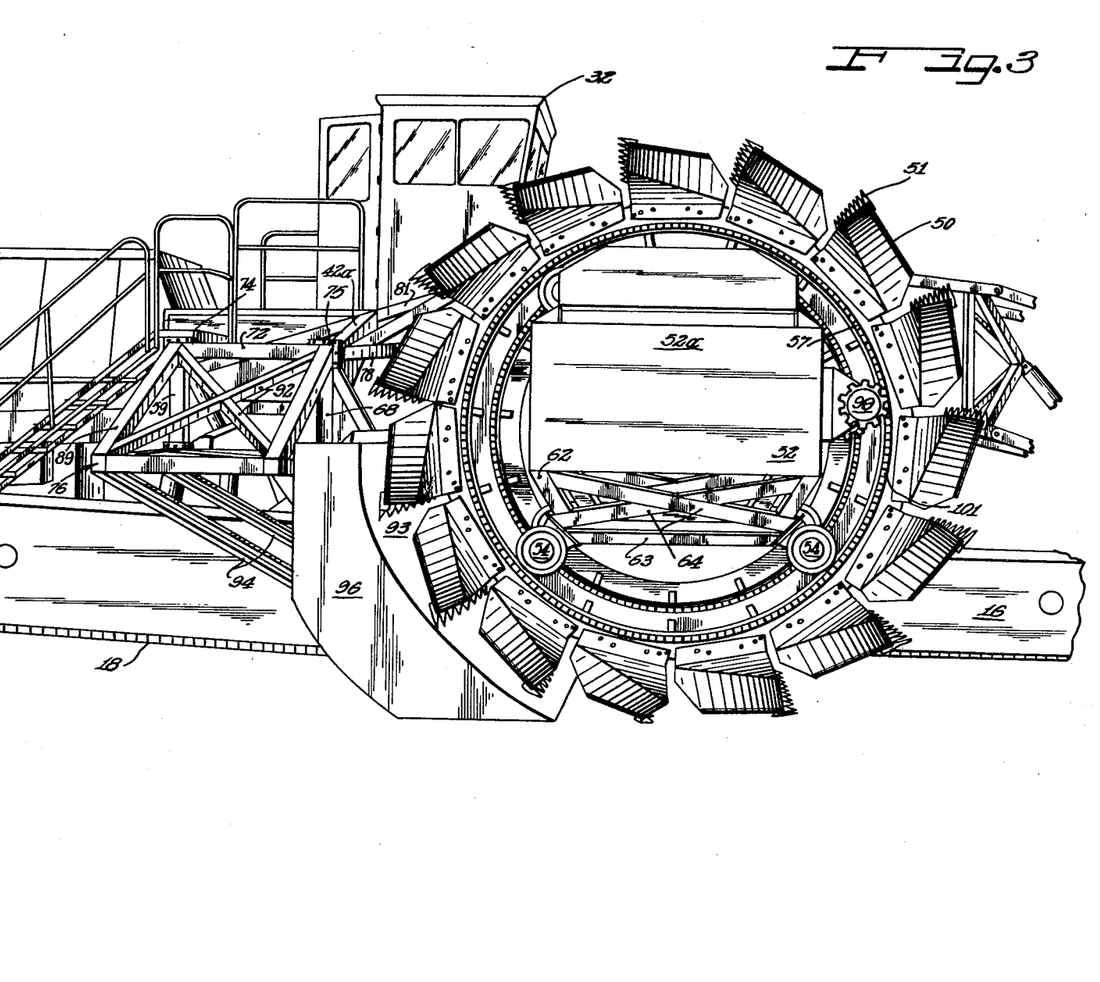
FIG. 3 is a side view showing the multiple digging wheels.

As shown on the drawings: The principles of the present invention are particularly useful when incorporated into a material handling device, generally indicated at 10, and illustrated in FIG. 1 as being used as an excavator. The material handling device 10 may also be used as a reclaimer either as illustrated in FIGS. 1 and 3 or as modified by providing a sloper and support boom as shown in my aforementioned patent application Ser. No. 523,189.

The material handling device 10 generally comprises a frame indicated at 11, mounted on spaced transporting and propelling means generally indicated at 12 with multiple digging wheels, generally indicated at 13 extending transversely from one side of the frame 11 and a conveying means generally indicated at 14 which receives the material dug by the wheels 13 and conveys it to a receptacle such as the earth mover generally indicated at 15.

As shown on FIG. 1, the digging wheels 13 extend transversely from a side of the frame 11 and are mounted on the frame 11 to dig material which is above the plane in which the transporting means 12 are in contact. The depth and angle at which the digging wheels 13 will dig are controlled by adjusting the position of the frame 11 with respect to the transporting means 12.

Figure 4:
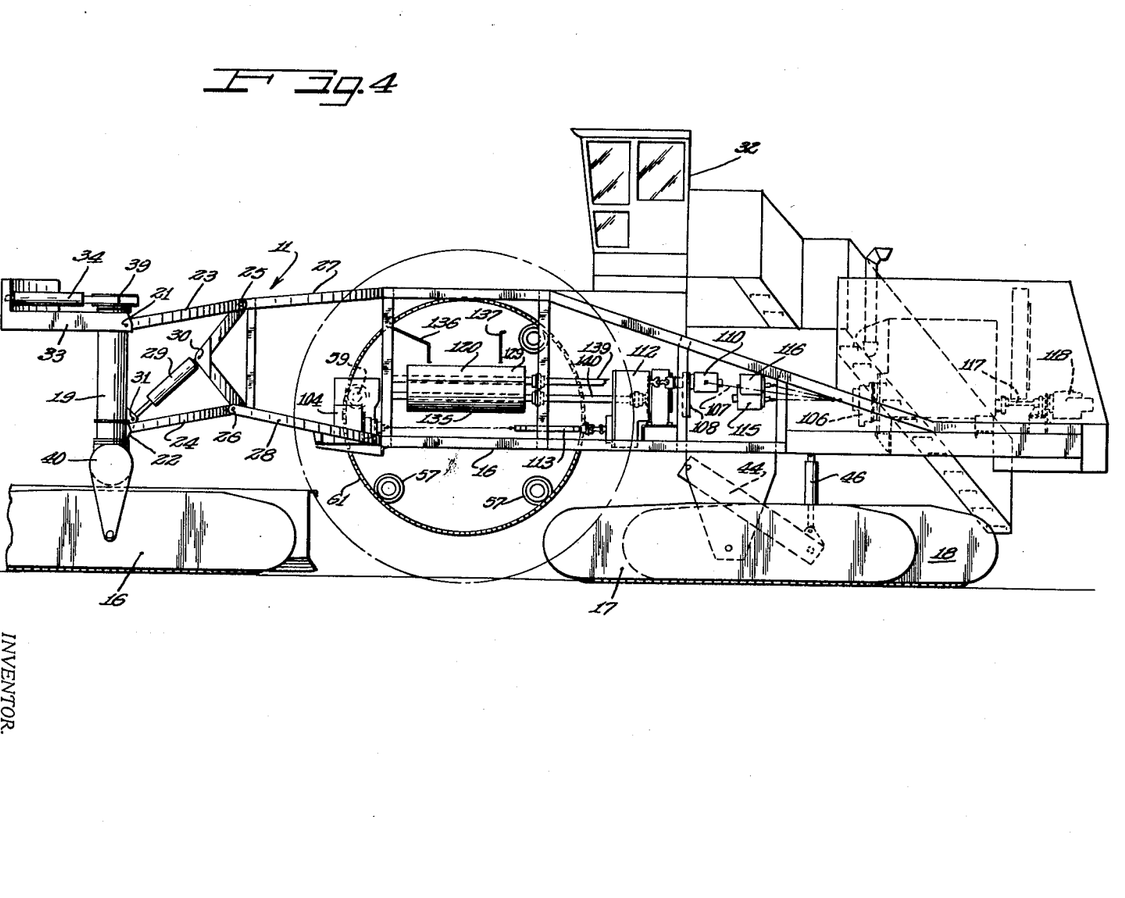
FIG. 4 is a side view, with parts removed for purposes of illustration, of the main frame structure and the drive means for the device.
Figure 5:
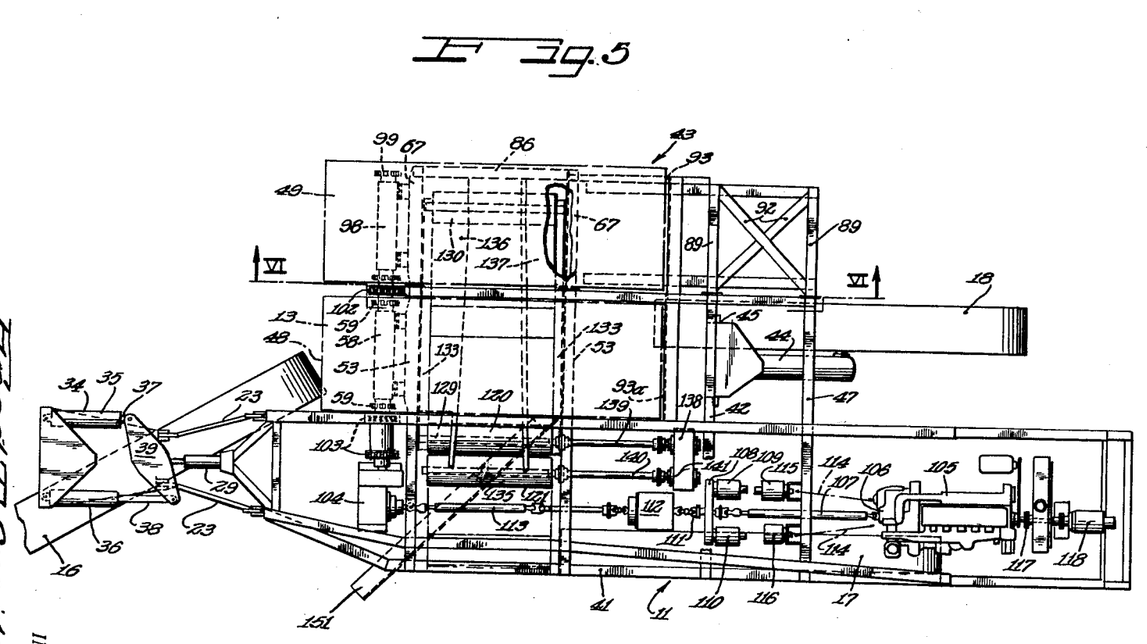
FIG. 5 is a plan view illustrating the frame structure and driving means of the material handling device of the present invention.

Referring to FIGS. 4 and 5, the frame 11 supported at its forward end by a front transporting and propelling means 16 which is illustrated as a crawler and a pair of rear transporting and propelling means 17 and 18 which are illustrated as an outside and inside crawler respectively. The front crawler 16 is journaled in a frame supporting column 19 for supporting the front end of the frame 11. The column 19 is pivotally secured at 21 and 22 to the main frame 11 by means of pairs of pivotal parallel column support arms 23 and 24. These arms 23 and 24 are in turn pivotally connected at 25 and 26 to fixed arms 27 and 28 carried on the frame 11. A hydraulic cylinder 29 is pivotally secured at 30 to the main frame between the pairs of arms 23 and 24 and at 31 to the column 19. Suitable controls are provided at an operator's cab 32 for regulating the operation of the hydraulic cylinder 29 to control the position of the frame 11 with respect to the front crawler 16 and, therefore, control the digging depth of the digging wheels 13. The column 19 has an upper column arm 33 which carries means 34 for steering the material handling device 10 and more particularly the front crawler 16. The means 34 includes a pair of side-by-side hydraulic cylinders 35 and 36 which are provided with rams 37 and 38 respectively which are connected to a steering post connector 39 which is attached to a steering post (not illustrated) that is telescopically received in the column 19 and attached to the crawler 16 by a crawler yoke 40. The crawler 16 is steered by providing fluid to the cylinders 35 and 36 which will cause the movement of the crawler with respect to the frame 11.

The rear or outside crawler 17 is attached to the frame 11 along the conveyor side 41 and the rear inside crawler 18 is attached to a transverse extension 42 to the frame 11 behind the digging wheels 13. As illustrated in FIG. 5, the position of the front and two rear crawlers forms a wheel area generally indicated at 43 in which the digging wheels 13 are mounted.

To adjust the angle of which the digging wheels 13 will operate the crawler 18 is pivotally mounted to an arm 44 which is pivotally attached at 45 to the extension or crawler frame member 42. A hydraulic cylinder 46 extending between a second transverse crawler frame member 47 and the arm 44 to adjust the angle at which the arm 44 extends from the frame and therefore adjust the height of the frame 11 with respect to the crawler 18. This adjustment in the height of the frame will vary the angle of the frame with respect to the horizontal and the angle with respect to the horizontal at which the digging wheels 13 will contact the surfaces being dug.

The multiple digging wheels 13 comprise an inner wheel 48 and an outer wheel 49. Both of the wheels 48 and 49 have a plurality of buckets 50 spaced around their respective peripheries. Each of the buckets 50 have teeth 51 for digging into the material whether it is a bank or stock pile to break the material up and allow it to be lifted by the bucket to an upper position and dropped into a box 52 of the conveyor means 14 as shown in FIG. 3.

Figure 6:
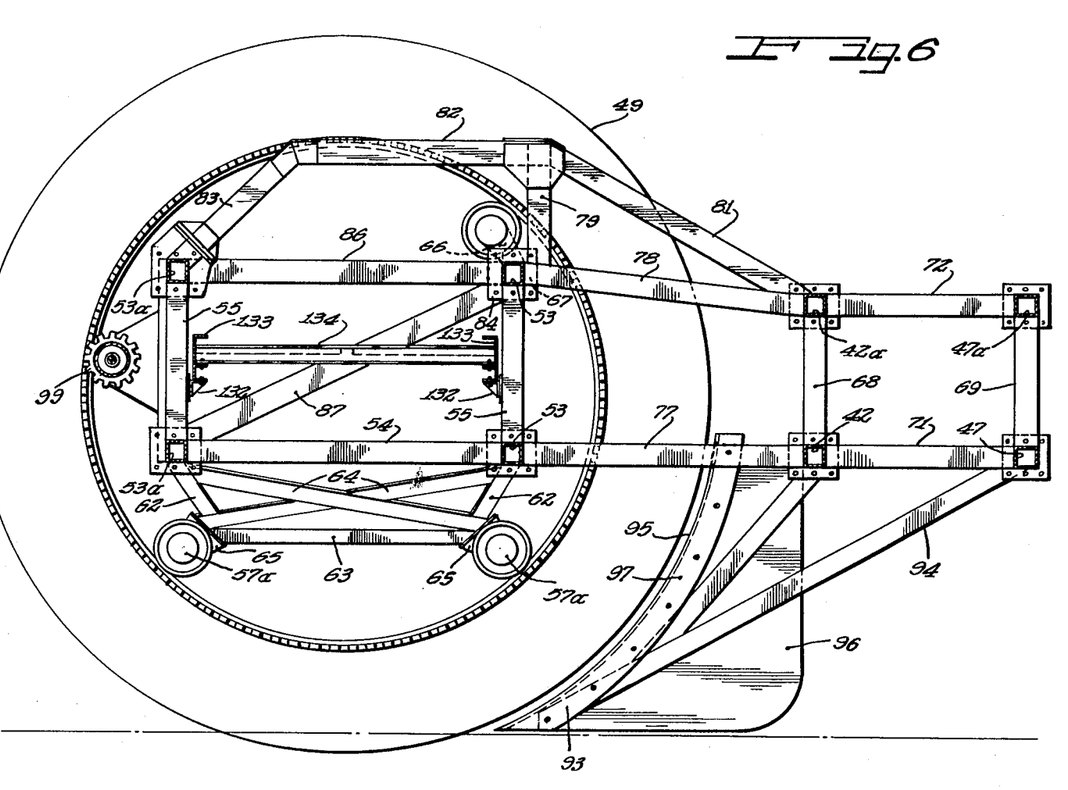
FIG. 6 is a cross section taken along line VI—VI of FIG. 5.

To support the inner digging wheel 13 in the wheel area 43 the frame 11 is provided with four transversely extending frame members 53 which extend approximately the width of the digging wheel 48. As shown in FIG. 6, the frame or inner wheel support members 53 are arranged with the bottom two members being interconnected by a cross member 54 and the upper two members being connected to the bottom members by upstanding frame members 55, 55 to form a three sided rectangle. Supported on the frame members 53 are three positioning rolls 57 and a drive shaft 58 having driving gears 59, 59 at each end which engage a circular rack 61 that is attached at each end of the digging wheel 48. The rolls 57 contact the periphery of the gear 61 and coact with the gears 59 to position the digging wheel on the desired axis. These rolls are supported in bearing blocks which are attached to the frame members 53 by means of a bearing block support structure which is similar to that illustrated in FIG. 6 for the outer digging wheel and consists of downwardly extending members 62, 62 from the frame members 53 which are interconnected at the bottom position by a cross member 63 and are provided with cross bracing members 64, 64. The frame structure 62, 63 and 64 has pads for supporting bearing blocks 65, 65 for the roller 57a, 57a for the outer digging wheel. The remaining positioning wheels of both the inner and outer wheel support structures are supported by bearing blocks 66 which are attached to the frame members 53 for the inner wheel and the corresponding outer frame members 67 for the outer digging wheel 49.

To increase the rigidity of the inner wheel support members 53, the crawler members 42 and 47 have additional respective members 42a and 47a which are interconnected by upright members 68 and 69 respectively to the members 42 and 47. The members 42 and 47 are interconnected by a cross member 71 and the upper members 42a and 47a are interconnected by a cross member 72. To increase the rigidity of the structure of the members 42, 42a, 47 and 47a angular cross members such as 73 are provided. Adjacent to the cross member 72 and 71, the members 42, 42a, 47 and 47a are provided with pads 74 on which similar pads 75 of the outer frame structure generally indicated at 76 are attached. The members 42 and 42a are interconnected to the inner wheel support or frame members 53 by longitudinally extending braces 77 and 78 respectively.

To provide rigidity to the forward two frame members 53a, an additional supporting structure assembly is provided. The supporting structure assembly comprises an upright member 79 attached to the member 78 adjacent to the frame member 53 and interconnected to the member 42a by an angular member 81. The upright member 79 is interconnected to the upper one of the two forward members 53a by a longitudinally extending member 82 which is secured to an angular member 83 that is connected to the member 53a. The structure comprising of the members 79, 81, 82, 83 provides an uplifting support for the forward frame member 53a and counteracts the torsional moments developed by the multiple digging wheels 13.

The frame members on inner support structure 53 are provided with plates or pads 84 on which pads 85 of the outer frame members or outer support structure 67 are connected. The connection between the pads 84, 85 secures the outer frame members 67 forming a cantilever supporting frame structure to the inner frame members 53. The pads 74, 75 and 84, 85 permit the rapid attachment and removal of the outer digging wheel 49 and the outer supporting frame structure. The outer frame members 67 terminate adjacent an outer edge of the outer digging wheel 49 and are interconnected by upright and cross members such as the cross member 86, shown in FIG. 6. The outer ends of the outer frame members 67 are also interconnected by an angular extending cross member 87 which extends from opposite corners of the rectangle formed by the upright and transverse members.

Figure 2:
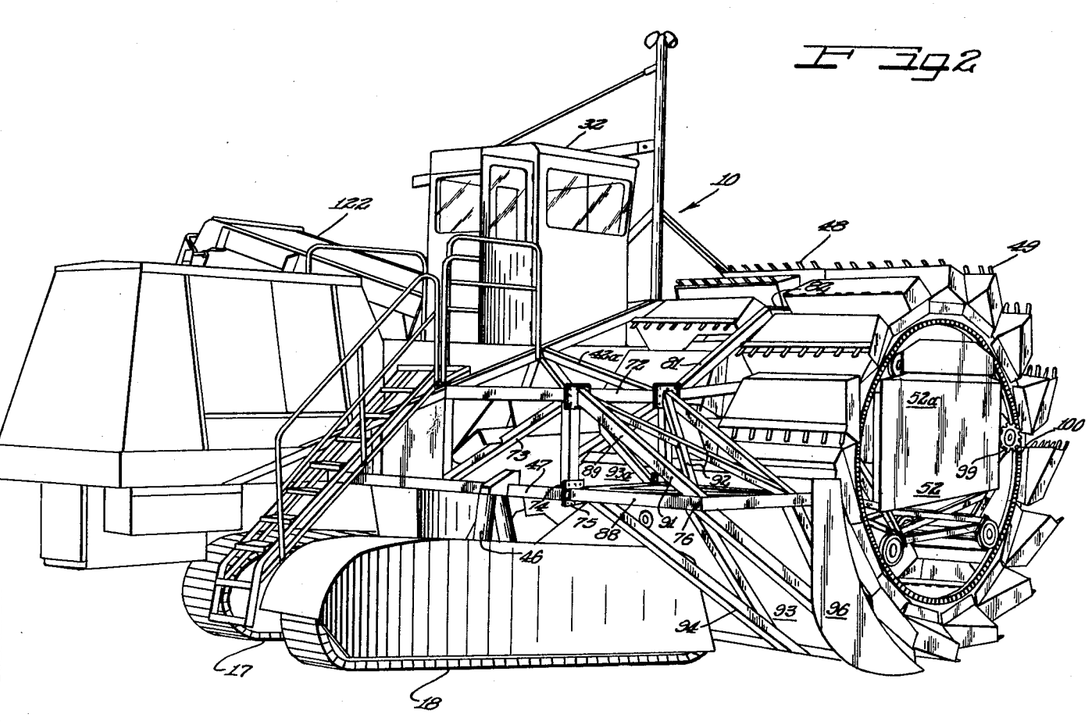
FIG. 2 is an isometric view of the present invention ilustrating the cantilever frame structure supporting the multiple digging wheels.

As shown in FIG. 2, the outer frame support structure 76 comprises a square frame member 88 which is attached by the lower two pads 75 to the members 42 and 47 and has the outer ends supported by a slanting frame structure 89 which consists of a pair of slanting members 91 and which are braced by cross members 92. The slanting members 91 are attached to pads 75 which in turn are attached to the pads 74 on the transverse members 42a and 47a. A crumber 93 is supported on the frame structure 76 by means of frame members 94 extending from the rectangular frame 88. The crumber 93 has a curved surface 95 which is complementary to the curved outer surface formed by the rotating digging wheel 49 and has an outer flange 96 which lies in the plane created by the outer edge of the outer wheel 49. The frame structure 76 positions the crumber 93 adjacent to the periphery of the digging wheel 49 so that material that has spilled from the digging wheel or was missed will be gathered and accumulated until the wheel can transport the material by the buckets 50 to the conveyer box 52. The inner wheel 48 is provided with a crumber 93a which is similar in structure to the crumber 93 and detachably secured thereto by a series of bolts passing through apertures in a flange 97 which is in the plane of the inner edge of the outer digging wheel 49. The crumber 93a is supported and disposed in a following relationship to the inner wheel 48 by structural members attached to the transverse crawler member 42.

The outer frame members 67 support an outer frame drive shaft 98 which has drive gears 99 at each end to engage the peripheral rack gear 101 on the outer wheel 49. The drive shaft 98 and the shaft 58 are detachably interconnected at their respective adjacent ends by a coupling means 102 which as illustrated consists of a sprocket gear on each of the two drive shafts interconnected by a chain belt. The shaft 58 is connected by a similar coupling 103 to a reduction gear transmission box 104.

To provide a motive power for the device 10, the frame 11 supports an internal combustion engine 105 such as a diesel which is connected to a torque converter 106 which may be a standard twin disk torque converting device. The output of the torque converter 106 is transmitted by a drive shaft 107 having universal joints to a transmission gearing device 108 which split the input to drive two hydraulic pumps 109 and 110 and delivers a mechanical output to the shaft 111 which leads to a gear reduction device 112 which has output a telescoping shaft 113 going to the reduction gear housing 104. The reduction gear device 104 include an elbow transmission means which contains a right-angled drive gearing such as a worm means and worm gearing for transmitting the mechanical output from the shaft 113 to the shafts 48 and 98.

The torque converting means 106 includes means to bypass mechanical forces to two drive shafts 114, which are illustrated as broken lines, to a pair of hydraulic pumps 115 and 116 respectively. The engine 105 also has a drive shaft 117 at the end opposite the torque converter 106 which drives a hydraulic pump 118. The power transmitted by the torque converter 106 to the drive shaft 107 drives both the multiple digging wheels 13 and the propelling means 16, 17 and 18. The propelling means 16, 17 and 18 are powered by hydraulic motors which are interconnected to the two hydraulic pumps 109 and 110 by conventional connections which are not shown.

The torque converter 106 provides a range of output power to the transmission gearing device 108 which proportions the output of the torque converter between the pumps 109, 110 and the digging wheels 13. When the digging wheels 13 require more power because of the nature of the material being dug, the pumps receive less power and therefore the propelling means 12 decreases the speed of advance of the device 10. Thus, the system using the torque converter 106 has a self compensating or balancing means in transporting the device as the digging load on the digging wheels increases and decreases with the corresponding decrease and increase in the speed of travel of the device 10.

The hydraulic pumps 115 and 118 produce an output of hydraulic fluid which is used to operate the conveying means 14. The remaining hydraulic pump produces the necessary fluid pressure used for operating hoists, steering systems, and cylinders for depth and angle control.

The conveying means 14 of the device 10 is made up of two conveying portions 120 and 121. The portions 120 is inner or first belt conveyer which extends into the centers of the digging wheels 48, 49 and conveys the material lifted by the bucket 50 of the wheel and dumped into the conveying box 52. The portion or second belt conveyer 121 extends upwardly from the termination of the first conveyer in a boom or frame 122 to convey the material dug into a waiting vehicle such as the earth mover 15. The frame 11 is provided with frame members 123 on which a pair of hydraulic cylinders 124 are mounted that are connected by their rams 125 to the boom 122 to position the boom or frame 122 at the desired angle. The boom 122 also has attached to its side a hydraulic motor 126 which is connected through a shaft 127 to an elbow transmission 128 to drive the head sheave or roll of the second conveyer 121.

The conveyer 120 consists of a belt extending between a head sheave or roll 129 and a foot sheave or roll 130 which is positioned in the center of the outer digging wheel 49. To support the rolls of the inner conveyer 120, the inner frame members 53 and the outer frame members 67 are each provided with a pair of transversely extending brackets 132, 132 which have a slight downward slope as they extend inward from the digging wheels. As best illustrated in FIG. 6, a channel member 133 is attached to each of the brackets 132 by any detachable means such as a bolt. The channel member 133 extends through both of the digging wheels 48 and 49 and has a brace 134. The rolls such as 129 and 130 are supported by bearing blocks at each of their respective ends in the channels 133, 133 and intermediate conveyer rolls also have their ends supported in a similar manner in the channels. Since the channels 133, 133 are detachably secured to the brackets 132, they may be disconnected and the entire conveyer 120 may be slid transversely with respect to the digging wheels. In order to facilitate the disconnection of the channels 133, the brace or member 86 and the transverse member 87 are detachable at their respective ends from the frame members 67 to allow access to the inner conveyer portion 120 to disconnect the channels 133, 133 from their support brackets or members 132. Once the channels 133, 133 have been disconnected from their respective brackets 132 the entire conveyer 120 may be moved transversely to an inner position in which the conveyer is completely contained within the first or inner digging wheel 48 and frame 11 as shown in phantom lines in FIG. 5. When the outer wheel 49 and its supporting outer frame members are detached for the purpose of transporting the device to a new working location, and the conveyor 120 assumed the inner position the effective width of the apparatus is reduced to that of the innermost wheel 48 and associated part of the frame 11.

A foot roll 135 of the second conveyer portion 121 is disposed adjacent the head roll 129 of the inner conveyer. As shown in FIG. 4, the second roll 135 is disposed slightly beneath the head roll 129 so that the material carried on the inner conveyer 120 falls onto the outer conveyer 121. The inner conveyer is provided with a box structure 52 comprising a front wall 136 and a rear wall 137 which are interconnected by the end wall 52a best illustrated in FIGS. 2 and 3. As the material hoisted by the buckets 50 is dumped into the box 52, the walls 136 and 137 hold the material until the inner or first conveyer 120 conveys it to the second or outer conveyer 121. To allow for the additional material from the inner digging wheel 48, the walls 136 and 137 diverge apart as the walls extend inward from the outer digging wheel 49 toward the second conveyer 121.

To drive the inner conveyer 120, a fluid motor 138, which is connected to one of the fluid pumps 115 or 118, drives by means of the shaft 139 the head roll 129. The outer or second conveyer 121 is driven at the foot roll 135 by means of a shaft 140 connected to a fluid motor 141 and by the fluid motors 126 which drive the head roll on the boom 122. The motors 126 and 141 are synchronized to drive their respective rolls at the same speed.

To remove material in the path of the front crawler 12, a plow member 150 is provided on the crawler. The plow will move material that has fallen from the bank being excavated or the pile being reclaimed, out of the path of the front crawler 12. The frame member 11 has a blade generally indicated at 151 which follows the front crawler 16 to guide material which has either been moved by the plow 150 or has fallen from the conveyer 14 to a point adjacent the inner wheel 48 so that the material will be picked up by the buckets 50 one the inner wheel and dumped into the conveyer means 14.

The material handling device 10 of the present invention is used to dig and remove materials which are extending substantially above the floor on which the transporting and propelling means 12 are in contact. The depth of which the digging wheels 48 and 49 may penetrate is controlled by changing the position of the frame 11 with respect to the front crawler by means of the hydraulic cylinder 29. To vary the angle of the frame 11 and digging wheels 13 from the horizontal plane, the hydraulic cylinder 46 is actuated which tilts the frame 11 either downwardly or upwardly and therefore tilts the cutting surfaces of the two digging wheels 48 and 49 which move with the frame 11.

With the addition of the outer digging wheel 49, the width of the device 10 is greatly increased; therefore, the cantilever structure comprising the outer frame member 57 which are attached to the end of the inner frame members 53 by joints comprising bolts extending between pads such as 75 and 74 allow the complete removal of the outer frame member once the inner conveyer 120 has been loosened from the respective bases or bracket members 132. By removing the outer digging wheel and its associated frame structure and by sliding the conveyer belt transversely into the inner digging wheel 48 the overall width of the device is reduced approximately five feet which is the width of the buckets on the outer wheel 49.

The addition of the outer wheel 49 doubles the capacity of the material handling device and therefore increases the amount of material which can be excavated by the device if used as an excavator. If the multiple wheel material handling device 10 is used as a reclaimer, it would have twice the capacity of the reclaimer disclosed in my aforementioned application Ser. No. 823,189.

Figure 7:
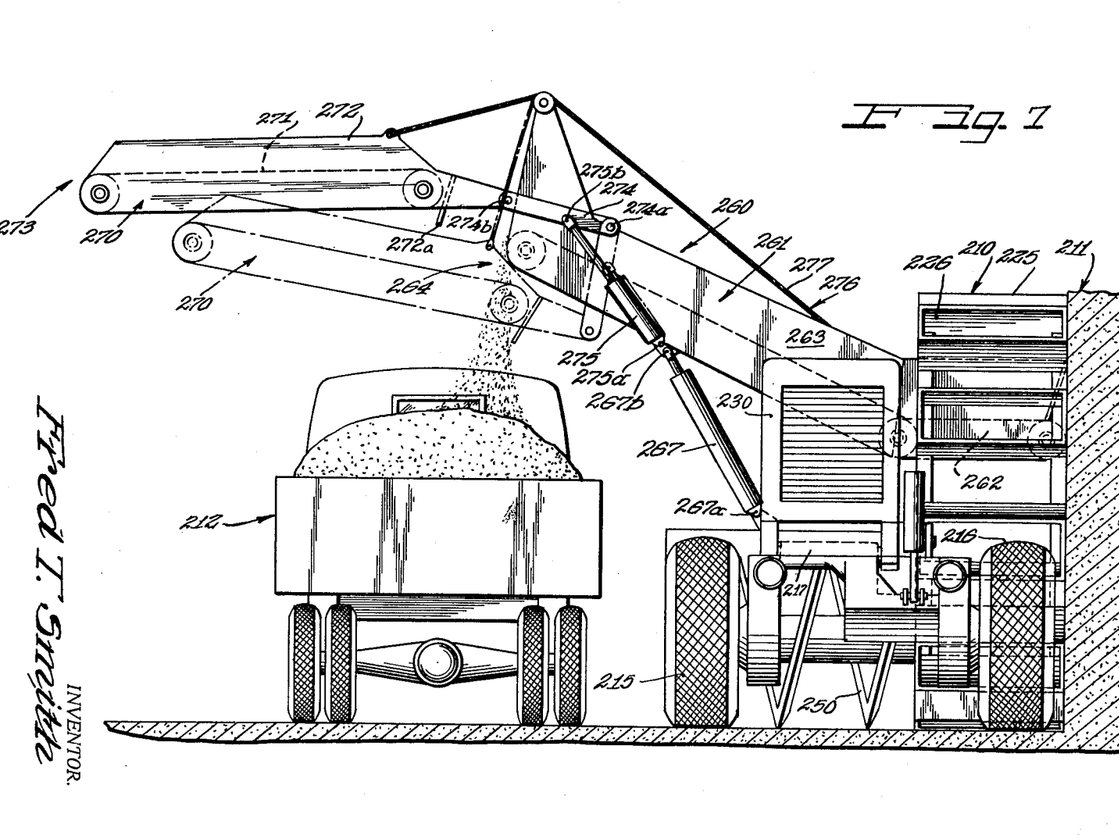
FIG. 7 is a rear view of my excavator with portions of the machine being shown in full and dotted lines whereby materials can be dug and transported to a truck.

The reference numeral 210 indicates generally my excavator or excavator machine for moving material from a bank 211 to a truck 212. It is significant to note that the machine 210 and the truck 212 are at the same level while the truck is being loaded. The excavator differs from conventional trenching machines of the digging wheel type where the machine is above ground level and its digging wheel extends below ground level. In operation, the excavator 210 is adapted to move transversely of the material to be excavated rather than directly into the material.

The machine 210 includes a front wheel 214 and inside and outside rear wheels 215 and 216 all mounted on a main frame 217. The wheels or transporting and propelling means which may be tracks, are driven by hydraulic motors 218, 219 and 220 which are in turn coupled with hydrostatic transmissions, 221, 222 and 223 and are operable through suitable controls (not shown).

Figure 8:
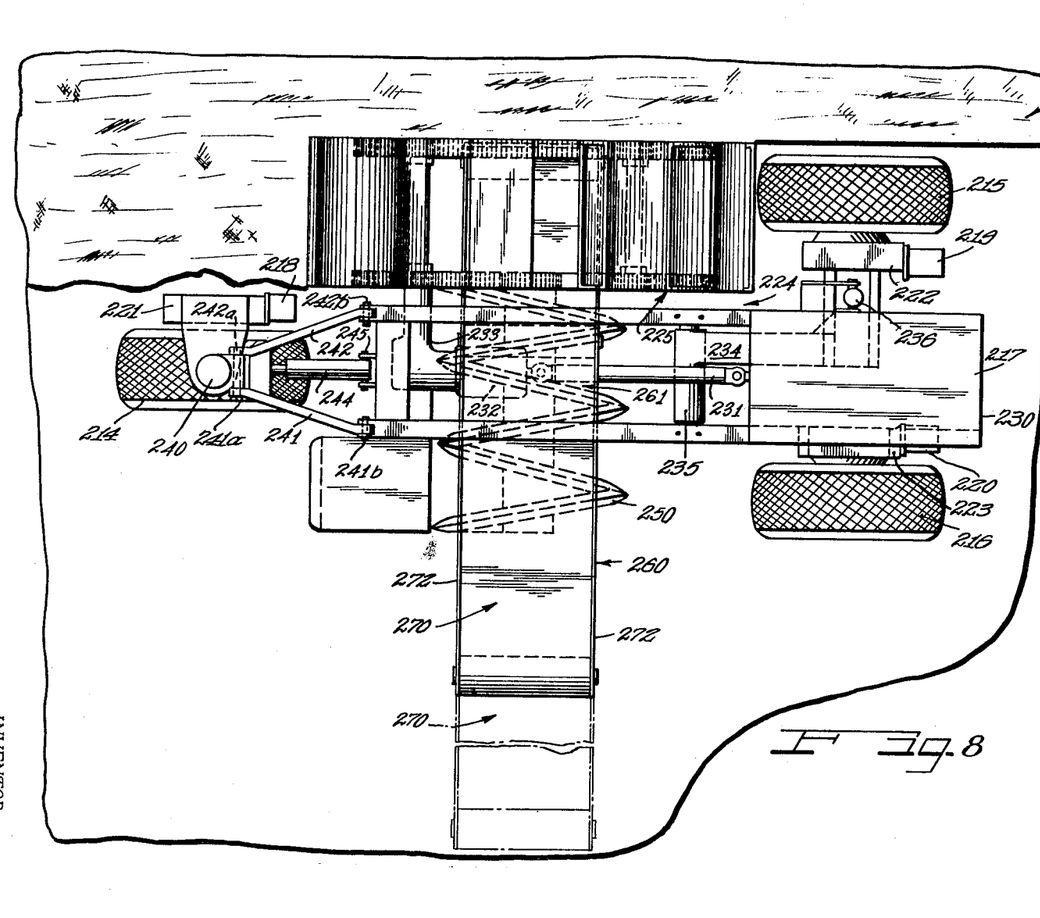
FIG. 8 is a top plan view of the excavator shown in FIG. 7.

As previously mentioned, the machine is provided with a three-wheel or three-track motivating system which has the front wheel or track offset to one side of a longitudinal center line passing between the rear wheels or tracks as illustrated in FIGURE 8, and the wheel movement enables precision control of the digging wheel. A wheel receiving area 224 is provided between the front and rear wheels to one side of the front wheel and a digging wheel 225 is disposed therein and carried by the main frame 217. The digging wheel 225 has a series of buckets 226 for digging into a bank of material.

An engine 230 is mounted on the frame 217 for turning the digging wheel 225. Coupled with the engine 230 is a drive shaft 231 that is in turn connected to gear box 232. The gear box is in turn connected to an angle box 233 for driving the digging wheel 225 by means of a gear 228 and a rack 229 (FIG. 9). The frame structure 217 is also provided with a support roller 227 defining a support means for supporting the digging wheel on the main frame.

The rear wheel 215 is mounted on a wheel pivot arm 234 that is in turn pivotally mounted at 235 on the main frame 217. A hydraulic cylinder 236 is connected to an opposite end 237 of the wheel pivot arm 234 for moving the rear wheel 215 vertically relative to the main frame 217. Suitable controls are provided at the operator's station (not shown) for controlling the hydraulic cylinder 236 whereby the digging angle of the digging wheel 225 can be regulated.

The front wheel 214 is journalled on a supporting column 240. This column 240 is in turn pivotally secured to the main frame 217 by means of the pairs of parallel column support arms 241 and 242. It will be noted that the arms are pivoted at 241a–241b and 242a–242b. A hydraulic cylinder 244 is pivotally secured at 245 to the main frame and at 246 to the column 240. Suitable controls are provided at the operator's station (not shown) for regulating the operation of the hydraulic cylinder 244 to control the digging depth of the digging wheel 225.

An auger 250 which is a material moving means or spillage directing means, is mounted transversely of the main frame 217 and transversely of the digging wheel 225. The auger 250 has the capability of digging 4 feet or 5 feet deep into the ground to convey the material horizontally to the digging wheel 225. During the course of the operation of the digging wheel 225, a certain amount of the material may tend to fall beneath the main frame 217 out of reach of the digging wheel and the auger 250 is provided to clean up and dig and move material beneath the main frame 217 into the digging wheel 225. From FIG. 9 it will be seen that the auger 250 has an auger gear 251 that is in mesh with the digging wheel rack 229 for driving the auger. If desired, a separate hydrostatic transmission can be provided for driving the auger. It will be further seen that the auger 250 is supported on bearings 252 at its end adjacent to the auger gear 251 and that auger support arms 253 and 254 are each connected at one end to the main frame 217 and at an opposite end with the bearing housing 252.

A conveyor system 260 is provided for moving the materials dug by the digging wheel 225 from the digging wheel to the truck 212. To this end, a first angled conveyor 261 is provided having a digging wheel section 262 and an angled section 263 for delivering materials to a first unloading station 264. The conveyor 261 has side plates 265—265 cooperable with a first conveyor belt 266 forming a trough to control the material dumped onto the belt 266 from the buckets 226 in the movement of the material to the first unloading station 264. The vertical position or elevation of the first conveyor 261 is controlled by the operation of a hydraulic cylinder 267 from an operator's station (not shown). The cylinder 267 is pivoted at one end 267a to the main frame 217 and at an opposite end 267b to the first conveyor 261.

The conveyor system 260 further includes a second conveyor 270 having a belt 271 and troughing plates 272 for transporting material to a second unloading station or position 273 extending between the troughing plates 272, 272 adjacent the end of the belt 271 is a deflecting structure 272a that protects the belt from being damaged by material discharging from the station 264. The second conveyor 270 has a pivotal link 274 pivotally connected at 274a to the first conveyor 261 and at 274b to the second conveyor 270. A hydraulic cylinder 275 is provided and connected at one end 275a to the first conveyor 261 and at an opposite end to the link 274 at 274b. When the cylinder 275 is extended, the conveyor 270 is elevated so the material is unloaded from the first unloading station 264.

The elevation of loading station 273 is controlled by a hydraulic winch 276 including its cable 277. When the second conveyor 270 is in an elevated position, the material unloaded onto the first conveyor 261 is discharged from the first unloading station 264. When the second conveyor 270 is lowered so that its upstream end is positioned beneath the discharge end of the first conveyor, the material is unloaded from the first conveyor 261 onto the second conveyor 270 for discharge at the second unloading position 273.

According to other important features of this invention, it is believed a new method has been evolved for cutting down a bank of material. To this end, the bank has a side face and a floor area for supporting the machine in immediate adjacency thereto. The method comprises the steps of digging into the pile by means of the digging wheel along the side face at a restricted area of the side face with respect to the total length of the side face and continuing such digging along the length of the side face as shown in FIG. 8. The thus dug materials are then elevated above the floor by the digging wheel and such materials are then converted into a stream of material flowing above the floor in angular relation away from the side face. Such materials are then discharged into the awaiting receptacle or truck from an elevated position above the floor all for the purpose of cutting down the bank to the level of the floor in the illustrated embodiment.

Another step of the instant method involves the redirecting of spillings from the material elevated by the digging wheel into the path of the digging and into the stream of material moving away from the side face. The spillings can be directed back into the path of the digging wheel by the auger 250.

I claim as my invention:

1. A device for handling material comprising:
a main frame including front and inside and outside rear transporting and propelling means with said front transporting and propelling means being offset to one side of at least one of said rear transporting and propelling means to provide a wheel area;
multiple digging wheels mounted on said main frame in said wheel area and positioned directly ahead and extending transversely beyond said inside transporting and propelling means; a conveyor extending transversely of the digging wheel and the frame having one end position for receiving material unloaded from the digging wheel and an opposite end position for transporting the material to an area remote from the digging wheel for unloading; and
means between the main frame and the inside rear transporting and propelling means for varying the height therebetween and the angle of operation of the digging wheels.

2. A material handling device comprising:
a frame mounted on a front and a pair of rear transporting and propelling means, said front one being offset from one of said rear ones to define a wheel area, said frame having support members extending transversely into said wheel area, said frame having additional frame members extending into said wheel area between said support members and said rear transporting and propelling means;
an inner digging wheel mounted for rotation on said frame members;
an outer digging wheel mounted for rotation on an outer frame member secured to said frame member, said outer frame member being secured to said inner frame member to dispose the outer digging wheel in alignment with said inner digging wheel,
said frame including supporting structure extending between said inner and outer digging wheels and interconnecting said support member and said additional frame member,
said supporting structure including members arranged to provide a lifting support to said frame member to counteract the torsional moment created by said digging wheels;
means to drive said digging wheels; and
a conveyor means including an inner conveyor belt extending into the center of said digging wheels to receive materials therefrom and to transport said materials received to an outer conveyor member for transporting said materials to a point removed from said frame.

3. An excavator comprising
a main frame including front wheel means and inside and outside rear wheels with the front wheel means being offset to one side of at least one of the rear wheels providing a wheel area,
an engine mounted on said frame having a drive shaft,
a gear box coupled with said drive shaft,
an angle box coupled with said gear box,
a digging wheel mounted on said main frame in said wheel area and positioned directly ahead and extended transversely beyond said inside rear wheel and with said digging wheel in driving connection with said angle box,
a conveyor extended transversely of the digging wheel and the main frame having one end extended into the interior short of an outboard side of the digging wheel and for transporting the material to a side of the main frame remote from the digging wheel for unloading, and
means between the main frame and the front wheel means for varying the relative vertical position between them to control the digging depth of the digging wheel.

4. An excavator comprising
a main frame including front wheel means and inside and outside rear wheels with the front wheel means being offset to one side of at least one of the rear wheels providing a wheel area,
an engine mounted on said frame having a drive shaft,
a gear box coupled with said drive shaft,
an angle box coupled with said gear box,
a digging wheel mounted on said main frame in said wheel area and positioned directly ahead and extended transversely beyond said inside rear wheel and with said digging wheel in driving connection with said angle box,
a digging auger mounted on said frame and extended inwardly of one side of said digging wheel to move material in to the digging wheel,
a conveyor extended transversely of the digging wheel and the main frame having one end extended into the interior of the digging wheel and for transporting the material to a side of the main frame remote from the digging wheel for unloading,
means between the main frame and the front wheel means for varying the relative vertical position between them to control the digging depth of the digging wheel, and
gearing between said digging wheel and said digging auger for driving the digging auger.

5. The art of cutting down a bank having a side face and a floor area in immediate adjacency thereto comprising
digging into the pile along the side face at a restricted area of the face with respect to the total length of the side face and continuing such digging along the length of the side face,
elevating the thus dug material above the floor,
creating a stream of material from the thus elevated material flowing above the floor in angular relation away from the side face and discharging the stream above the floor, and
redirecting the spillings from the elevated material from the floor into the path of the digging and into the stream of material moving away from the side face for the purpose of cutting down the bank to the level of the floor.

6. An excavator for cutting alongside and into a bank comprising
a main frame including front wheel means and rear wheels with the front wheel means being offset to one side of at least one of the rear wheels providing a wheel area,
a digging wheel mounted on said main frame in said wheel area and positioned directly ahead and extended transversely beyond one of the rear wheels,
a digging auger mounted on said frame and extended inwardly to one side of said digging wheel and rotating in a direction to move material into the digging wheel, and a conveyor extended transversely of the digging wheel and the main frame having one end extended into the interior of the digging wheel but short of an outboard side of the digging wheel for receiving materials from the auger and materials unloaded from the digging wheel and for transporting the materials to a side of the main frame remote from the digging wheel for unloading.

7. An excavator machine for cutting alongside and into a bank comprising
a main frame including front wheel means and rear wheels with the front wheel means being offset to one side of at least one of the rear wheels,
a digging wheel mounted on one side of said main frame and offset at one side of the front wheel means and positioned directly ahead of the rear wheels,
a digging auger mounted on said frame and extended inwardly on one side of said digging wheel and rotating in a direction to move material into the digging wheel, a conveyor extended transversely of the digging wheel and the main frame having one end extended from one side of the main frame into the interior of the digging wheel but short of an outboard side of the digging wheel for receiving materials unloaded from the digging wheel and for transporting the material to an opposite side of the main frame for unloading, and
steering means cooperable with the front wheel means for steering the machine.

8. An excavator for cutting alongside and into a bank comprising
a main frame including front wheel means and rear wheels with the front wheel means being offset to one side of at least one of the rear wheels,
a digging wheel mounted on one side of said main frame and offset at one side of the front wheel means and positioned ahead of the rear wheels,
means for driving said digging wheel,
a digging auger mounted on said frame and extended inwardly of one side of said digging wheel to move material into the digging wheel,
gear means between said digging wheel and said auger for driving said auger, and
a conveyor extended transversely of the digging wheel and the main frame having one end extended from one side of the main frame into the interior of the digging wheel but short of an outboard side of the digging wheel for receiving materials unloaded from the digging wheel and for transporting the material to an opposite side of the main frame for unloading.

9. An excavator for cutting alongside and into a bank comprising
a main frame including front wheel means and inside and outside rear wheels with the front wheel means being offset to one side of at least one of the rear wheels providing a wheel area,
a digging wheel mounted on said main frame in said wheel area and positioned directly ahead and extended transversely beyond said inside rear wheel, and with the digging wheel being operated essentially at all times with its transverse axis being positioned above the axis of said front wheel means and rear wheels as distinguished from a wheel type ditching machine, said digging wheel being mounted on the frame with its outboard side free of projections permitting the outboard edge of this digging wheel to cut into the bank free of interference from the frame,
a conveyor extended transversely of the digging wheel and the main frame having one end positioned for receiving materials unloaded from the digging wheel and an opposite end positioned for transporting the materials to an area remote from the digging wheel for unloading, and
means between the main frame and the inside rear wheel for varying the plane of operation of the digging wheel.

10. A bank or pile cutting machine for cutting down a bank in successive passes comprising
a main frame having front and at least two rear frame propelling means with said front frame propelling means being offset to one side of at least one of the rear frame propelling means providing a wheel area,
a digging wheel mounted outboard of one side of said main frame in said wheel area and positioned directly ahead of one of the rear frame propelling means and transversely to one side of said front frame propelling means, the lower cutting surface of the digging wheel being at the approximate level of the traction during the cutting operation with one of the rear propelling means tracking behind the digging wheel as the digging wheel excavates the material immediately forward of the digging wheel and the aforesaid tracking rear propelling means,
a cross conveyor having an end inside of the digging wheel positioned to avoid interference with the bank being cut and being operable to convey dug materials in a direction away from the face of the bank to an area inboard of an inboard side of the digging wheel, and engine means mounted for driving said digging wheel.

11. A bank cutting machine comprising a frame, frame propelling means on the frame including a front end propelling means, a digging wheel rigidly mounted on said frame rearwardly behind said front end propelling means and totally outboard of the front end propelling means permitting the entire outboard vertical cutting edge of the wheel to be free for cutting into a bank alongside of the machine, a conveyor positioned on the frame transversely of the digging wheel receiving materials from the digging wheel for conveying materials to one side of the digging wheel, and, the conveyor having its outboard end positioned inwardly of an outboard face of the digging wheel, and means between said front end propelling means and said frame for varying the vertical position of the frame as well as the digging wheel with respect to the front end propelling means to enable the depth of cut to be varied.

12. A wheel-type top loading machine for loading a material transporting apparatus as the machine is moved alongside of a cut bank or pile comprising a main frame, longitudinally spaced front and rear frame transporting means secured with the main frame for transporting the same, a digging wheel disposed at one side of the frame having its axis longitudinally between said front and rear transporting means and with said digging wheel being outboard of said front transporting means, cantilever means suspending the digging wheel from its inboard side leaving an outboard side of said digging wheel totally free from interference from any frame structure, the digging wheel having annularly arranged buckets defining digging edges, and conveying means extended transversely of the digging wheel and the main frame having one end positioned interiorly of the wheel for receiving material unloaded from the buckets and having an opposite end extending beyond the side of the frame remote from the digging wheel.

13. The machine of claim 12 further characterized by said rear frame transporting means including rear wheel means tracking generally behind said digging wheel, and means between said rear wheel means and said main frame for varying the vertical position of the digging wheel.

14. The machine of claim 12 further characterized by having means disposed between said main frame and said front frame transporting means for varying the relative vertical position of the main frame and the digging wheel to control the digging depth of the digging wheel.

15. The machine of claim 12 further characterized by means being disposed on the inboard side of the digging wheel beneath the main frame for moving material into the digging wheel from its inboard side.

16. The machine of claim 15 further characterized by said means disposed on the inboard side of the digging wheel comprising an auger for directing spilled material into the digging wheel.

17. The machine of claim 12 further characterized by said front and rear transporting means comprising a pair of rear wheel means and a front wheel means with front wheel means being offset to one side of one of said rear wheel means providing a wheel area with said digging wheel supported and suspended therein for effectively transmitting and distributing the digging forces to the main frame.

18. A wheel-type top loading machine for loading a material transporting apparatus as the machine is moved along side of a cut bank or pile.

a main frame, longitudinally spaced front and rear frame transporting means secured with the main frame for transporting the same, a digging wheel disposed at one side of the frame having its axis longitudinally between said front and rear transporting means and with said digging wheel being outboard of said front transporting means, cantilever means suspending the digging wheel from its inboard side leaving an outboard side of said digging wheel totally free from interference from any frame structure, the digging wheel having annularly arranged buckets defining digging edges, conveying means extended transversely of the digging wheel and the main frame having one end positioned interiorly of the wheel for receiving material unloaded from the buckets and having an opposite end extending beyond the side of the frame remote from the digging wheel, said conveying means including first and second conveyors, said first conveyor extended transversely of the digging wheel and the main frame having one end positioned for receiving materials unloaded from the digging wheel and for transporting the material to a side of the main frame remote from the digging wheel for unloading at a first unloading station, said second conveyor supported on said main frame and having a second unloading situation positioned outwardly of said first unloading station, and power actuating means for positioning said second conveyor in selective positions relative to said first conveyor enabling materials to be unloaded from the conveyors at the first or second unloading stations.

19. The machine of claim 18 further characterized by said second conveyor overlying said first conveyor when in a non-receiving position.

20. The machine of claim 18 further characterized by a deflector plate being positioned with respect to said second conveyor to prevent damage to its belt while the second conveyor is in a raised position.

21. A wheel-type top loading machine for loading a material transporting apparatus as the machine is moved along side of a cut bank or pile, a main frame, longitudinally spaced front and rear frame transporting means secured with the main frame for transporting the same, a digging wheel disposed at one side of the frame having its axis longitudinally between said front and rear transporting means and with said digging wheel being outboard of said front transporting means, cantilever means suspending the digging wheel from its inboard side leaving an outboard side of said digging wheel totally free from interference from any frame structure, said cantilever means rigidly mounting said digging wheel on said main frame enabling said frame and digging wheel to move in unison together, the digging wheel having annularly arranged buckets defining digging edges, and conveying means extended transversely of the digging wheel and the main frame having one end positioned interiorly of the wheel for receiving material unloaded from the buckets and having an opposite end extending beyond the side of the frame remote from the digging wheel.

22. A wheel-type top loading machine for loading a material transporting apparatus as the machine is moved along side of a cut bank or pile, a main frame, longitudinally spaced front and rear frame transporting means secured with the main frame for transporting the same, a digging wheel disposed at one side of the frame having its axis longitudinally between said front and rear transporting means and with said digging wheel being outboard of said front transporting means, cantilever means suspending the digging wheel from its inboard side leaving an outboard side of said digging wheel totally free from interference from any frame structure, said cantilever means rigidly mounting said digging wheel on said main frame enabling said frame and digging wheel to move in unison together, the digging wheel having annularly arranged buckets defining digging edges, conveying means extended transversely of the digging wheel and the main frame having one end positioned interiorly of the wheel for receiving material unloaded from the buckets and having an opposite end extending beyond the side of the frame remote from the digging wheel, said rear frame transporting means including at least one rear wheel means, and means between said at least one rear wheel means and the main frame for varying the vertical position of one relative to the other to control the operation of the digging wheel and the conveying means.

23. A wheel-type loading machine for loading a material transporting apparatus as the machine is moved along side of a cut bank or pile, a main frame, longitudinally spaced front and rear frame transporting means secured with the main frame for transporting the same, a digging wheel disposed at one side of the frame having its axis longitudinally between said front and rear transporting means and with said digging wheel being outboard of said front transporting means, cantilever means suspending the digging wheel from its inboard side leaving an outboard side of said digging wheel totally free from interference from any frame structure, said cantilever means rigidly mounting and digging wheel on said main frame enabling said frame and digging wheel to move in unison together, the digging wheel having annularly arranged buckets defining digging edges, conveying means extending transversely of the digging wheel and the main frame having one end positioned interiorly of the wheel for receiving material unloaded from the buckets and having an opposite end extending beyond the side of the frame remote from the digging wheel, and means between the main frame and the front transporting means for varying the relative vertical position between them to control the digging depth of the digging wheel.

24. A wheel-type top loading machine for loading a material transporting apparatus as the machine is moved along side of a cut bank or pile, a main frame, longitudinally spaced front and rear frame transporting means secured with the main frame for transporting the same, a digging wheel disposed at one side of the frame having its axis longitudinally between said front and rear transporting means and with said digging wheel being outboard of said front transporting means, cantilever means suspending the digging wheel from its inboard side leaving an outboard side of said digging wheel totally free from interference from any frame structure enabling the digging wheel to be free for digging the full vertical diameter of the digging wheel, the digging wheel having annularly arranged buckets defining digging edges, conveying means extended transversely of the digging wheel and the main frame having one end positioned interiorly of the wheel for receiving material unloaded from the buckets and having an opposite end extending beyond the side of the frame remote from the digging wheel, and means for driving said frame supporting means whereby said machine is a self-propelled vehicle.

25. A wheel-type top loading machine for loading a material transporting apparatus as the machine is moved along side of a cut bank or pile, a main frame having a three-point suspension including longitudinally spaced front and rear frame transporting means secured with the main frame for transporting the same and providing a wheel area, a digging wheel disposed at one side of the frame having its axis longitudinally between said front and rear transporting means and with said digging wheel being outboard of said front transporting means, cantilever means suspending the digging wheel from its inboard side in said wheel area thus enabling digging forces to be effectively transmitted to the main frame and to its three points of suspension and leaving an outboard side of said digging wheel totally free from interference from any frame structure, the digging wheel having annularly arranged buckets defining digging edges, and conveying means extended transversely of the digging wheel and the main frame having one end positioned interiorly of the wheel for receiving material unloaded from the buckets and having an opposite end extending beyond the side of the frame remote from the digging wheel.

26. The art of top loading a material carrying device from an elevated position relative to the carrying device comprising digging in an arc in excess of 90° into the pile along a side face at a restricted area with respect to the total length of said side face and continuing such digging along the length of said side face, while digging creating an upward arcuate flow of excavated material with the axis of the arcuate flow being generally at right angles to the plane of the cut face, moving the thus dug elevated material in a stream generally axial of said arcuate flow in angular relation away from the cut face, and discharging the stream from an overhead unloading position into a carrying device.

27. The art of top loading a material carrying device according to claim 26 wherein said arcuate flow includes a plurality of axially aligned arcuate flows, each discharging into said stream so that the thus elevated material of the flows is moved away from said cut face.

28. The art of top loading material carrying devices from elevated positions relative to the carrying devices comprising digging in an arc in excess of 90° into the pile along a side face at a restricted area with respect to the total length of said face and continuing such digging along the length of said side face, while digging creating an upward arcuate flow of excavated material with the axis of the arcuate flow being generally at right angles to the plane of the cut face, moving the thus dug elevated material in a stream generally axial of said arcuate flow in angular relation away from the cut face, and selectively discharging the stream from first and second overhead unloading positions first into one carrying a device and then into another carrying device.

29. The art of top loading trucks from spaced elevated positions relative to the trucks comprising digging in an arc in excess of 90° into the pile along a side face at a restricted area with respect to the total length of said side face and continuing such digging along the length of said side face, while digging creating an upward arcuate flow of excavated material with the axis of the arcuate flow being generally at right angles to the plane of the cut face, moving the thus dug elevated material in a stream generally axial of said arcuate flow in angular relation away from the cut face, and selectively discharging the stream from a first overhead unloading position into a first truck and after filling the first truck then discharging the stream from a second overhead unloading position into a second truck while the first loaded truck is replaced by another unloaded truck and thereby continuously discharging the stream into a series of trucks to maintain a continuous loading operation.

30. The art of top loading trucks of claim 29 further characterized by loading the trucks while in positions generally in axial alignment with the axis of the arcuate flow.

31. The art of top loading a material carrying device from an elevated position relative to the carrying device comprising digging in an arc in excess of 90° into the pile along a side face at a restricted area with respect to the total length of said side face and continuing such digging along the length of said side face, while digging creating a pair of upward arcuate flows of excavated material with the axis of the arcuate flows being generally at right angles to the plane of the cut face, moving the thus dug elevated material in a stream generally axial of said arcuate flows in angular relation away from the cut face, and discharging the stream from an overhead unloading position into a carrying device.

32. A bank or pile cutting machine for cutting down a bank in successive passes comprising a main frame having front and at least two rear frame propelling means with said front frame propelling means being offset to one side of at least one of the rear frame propelling means providing a wheel area, multiple digging wheels mounted outboard of one side of said main frame in said wheel area and positioned directly ahead of one of the rear frame propelling means and transversely to one side of said front propelling means, the lower cutting surface of the digging wheels being at the approximate level of the traction during the cutting operation with one of the rear propelling means tracking behind the digging wheels as the digging wheels excavate the material immediately forward of the digging wheels and the aforesaid tracking rear propelling means, a cross conveyor having an end inside of the digging wheels positioned to avoid interference with the bank being cut and being operable to convey dug materials in a direction away from the face of the bank to an area inboard of the inboard side of the innermost digging wheel, and engine means mounted for driving said digging wheels.

33. A wheel-type top loading machine for loading a material transporting apparatus as the machine is moved alongside of a cut bank or pile comprising a main frame, longitudinally spaced front and rear frame transporting means secured with the main frame for transporting the same, multiple digging wheels disposed at one side of the frame having their axes longitudinally between said front and rear transporting means and with said digging wheels being outboard of said front transporting means, cantilever means suspending the outermost digging wheel from its inboard side leaving an outboard side of said digging wheel totally free from interference from any frame structure, the digging wheels having annularly arranged buckets defining digging edges, and conveying means extending transversely of the digging wheels and the main frame having one end positioned interiorly of the wheels for receiving material unloaded from the buckets and having an opposite end extending beyond the side of the frame remote from the digging wheels.

34. A machine according to claim 33 wherein said multiple digging wheels comprise an inner and outer digging wheel, said frame means including a support structure extending transversely from said one side for rotatably supporting the inner digging wheel, said cantilever means being attached to the outer end of said support structure by detachable connection means enabling removal of the cantilever means and outer wheel to facilitate shipping of said machine.

35. A machine according to claim 34, wherein said conveyor means is detachably mounted at said one end to said cantilever means so that the one end of the conveyor means can be detached and moved into said inner digging wheel as the outer wheel and cantilever structure is removed.

36. A machine according to claim 33 wherein said multiple digging wheels comprise an inner and outer digging wheel, said frame means including a support structure extending transversely from said one side for rotatably supporting the inner digging wheel, said frame means having an additional frame member extending from said one side between said support structure and said rear transporting means, said additional frame members including a support member extending between the inner and outer digging wheels and secured to said support structure to increase the rigidity of the inner wheel support structure to counteract the torsional movement created by said digging wheels.

37. A machine according to claim 33 which includes a crumber supported on said frame in a following relationship to said multiple digging wheels whereby material falling from said wheels is gathered and accumulated by said crumber until said wheels transport the material to said conveyor means.

38. A machine according to claim 33, which includes means between said front transporting means and said frame for varying the vertical position of the frame as well as the digging wheels with respect to the front transporting means to enable the depth of cut to be varied.

39. A wheel-type top loading machine for loading a material transporting apparatus as the machine is moved along side of a cut bank or pile, a main frame, longitudinally spaced front and rear frame transporting means secured with the main frame for transporting the same, a first digging wheel disposed at one side of the frame having its axis longitudinally between said front and rear transporting means and with said digging wheel being outboard of said front transporting means, cantilever means suspending a second digging wheel from its inboard side in alignment with said first digging wheel leaving an outboard side of said second digging wheel totally free from interference from any frame structure enabling the digging wheels to be free for digging the full vertical diameter of the digging wheels, each of said digging wheels having annularly arranged buckets defining digging edges, conveying means extended transversely of the digging wheels and the main frame having one end positioned interiorly of the wheels for receiving material unloaded from the buckets of each digging wheel and having an opposite end extending beyond the side of the frame remote from the digging wheels, and means for driving said frame transporting means whereby said machine is a self-propelled vehicle.

40. A wheel-type loading machine for loading a material transporting apparatus as the machine is moved along a side of a cut bank or pile, a main frame, longitudinally space front and rear frame transporting means secured with the main frame for transporting the same, axially aligned multiple digging wheels disposed at one side of the frame having their axes longitudinally between said front and rear transporting means and with said digging wheels being outboard of said front transporting means, frame means suspending said digging wheels including cantilever means suspending the outermost digging wheel from its inboard side leaving an outboard side of said outermost digging wheel totally free from interference from any frame structure, said frame means rigidly mounting said digging wheels on said main frame enabling said frame and digging wheels to move in unison together, the digging wheels having annularly arranged buckets defining digging edges, and conveying means extended transversely of the digging wheels and the main frame having one end positioned interiorly of the wheels for receiving material unloaded from the buckets of each of the wheels and having an opposite end extending beyond the side of the frame remote from the digging wheels 41. A wheel-type top loading machine for loading a material transporting apparatus as the machine is moved along side of a cut bank or pile, a main frame having a three-point suspension including longitudinally spaced front and rear frame transporting means secured with the main frame for transporting the same and providing a wheel area, a pair of digging wheels disposed in axial alignment at one side of the frame having their axes longitudinally between said front and rear transporting means and with said digging wheels being outboard of said front transporting means, the digging wheels having annularly arranged buckets defining digging edges, frame means suspending the digging wheels in said wheel area thus enabling digging forces to be effectively transmitted to the main frame and to its three points of suspension, said frame means including a cantilever frame suspending the outer digging wheel from the inboard side, and leaving an outboard side of said outer digging wheel totally free from interference from any frame structure, and conveying means extended transversely of the digging wheels and the main frame having one end positioned interiorly of the wheels for receiving material unloaded from the buckets of each of said wheels and having an opposite end extending beyond the side of the frame remote from the digging wheels.

References Cited

UNITED STATES PATENTS

| | | | |
|---|---|---|---|
| 1,739,888 | 12/1929 | Clark. | |
| 872,159 | 11/1907 | Van Buren | 37—97 |
| 885,343 | 4/1908 | Hill | 37—97 |
| 1,246,524 | 11/1917 | Bager | 37—94 |
| 1,384,207 | 7/1921 | Mowry | 37—110 |
| 1,538,565 | 5/1925 | Loken | 37—94 |
| 1,828,532 | 10/1931 | Gustafson | 37—110 |
| 1,852,048 | 4/1932 | George | 37—97 |
| 2,237,773 | 4/1941 | Van Voorhis et al. | 37—97 |
| 2,598,339 | 5/1952 | Askue | 37—97 XR |
| 2,618,083 | 11/1952 | Armington et al. | 37—110 |
| 2,756,521 | 7/1956 | Clark | 37—110 |

FOREIGN PATENTS

| | | |
|---|---|---|
| 137,833 | 10/1956 | U.S.S.R. |
| 642,126 | 6/1962 | Canada. |

ROBERT E. PULFREY, Primary Examiner

U.S. Cl. X.R.

37—195;180—26; 198—9, 91, 103, 104

UNITED STATES PATENT OFFICE
CERTIFICATE OF CORRECTION

Patent No. 3,500,563      Dated March 17, 1970

Inventor(s) Fred T. Smith

It is certified that error appears in the above-identified patent and that said Letters Patent are hereby corrected as shown below:

Column 14, line 33, change "situation" to read --station--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents